United States Patent
Masuda

(10) Patent No.: US 6,172,954 B1
(45) Date of Patent: Jan. 9, 2001

(54) ASYMMETRY COMPENSATION APPARATUS AND REPRODUCTION APPARATUS FOR RECORDABLE DISC

(75) Inventor: Shozo Masuda, Tokyo (JP)

(73) Assignee: Sony Corporation, Tokyo (JP)

( * ) Notice: Under 35 U.S.C. 154(b), the term of this patent shall be extended for 0 days.

(21) Appl. No.: 09/192,890

(22) Filed: Nov. 16, 1998

(30) Foreign Application Priority Data

Nov. 17, 1997 (JP) ................................... 9-315693

(51) Int. Cl.[7] .................................................. G11B 7/00
(52) U.S. Cl. ................................................. 369/54; 369/59
(58) Field of Search ................... 369/59, 54, 48, 369/47, 58

(56) References Cited

U.S. PATENT DOCUMENTS 5,781,521 * 7/1998 Kim ........................................ 369/59

* cited by examiner

Primary Examiner—Nabil Hindi
(74) Attorney, Agent, or Firm—Limbach & Limbach L.L.P.

(57) ABSTRACT

When a linking-point indicating signal, a defect detection signal, and a peak detection signal are obtained, a switch control section controls the on/off states of switches such that the time constant of a filter section becomes smaller or larger than the standard value during the specified period. With this control, in a linking section or a period in which a reproduced signal is missing, the threshold for asymmetry compensation traces a signal state at a higher speed, or the preceding threshold is maintained irrespective of the state of an input signal.

13 Claims, 18 Drawing Sheets

FIG. 13

STATES 1 AND 2

```
        (MSB)                    (LSB)  /  (MSB)                    (LSB)
SY0 = 0001001001000100  0000000000010001 / 0001001000000100  0000000000010001
SY1 = 0000010010000100  0000000000010001 / 0000010001000100  0000000000010001
SY2 = 0001000000000100  0000000000010001 / 0001000001000100  0000000000010001
SY3 = 0000100000000100  0000000000010001 / 0000100001000100  0000000000010001
SY4 = 0010000000000100  0000000000010001 / 0010000001000100  0000000000010001
SY5 = 0010001001000100  0000000000010001 / 0010001000000100  0000000000010001
SY6 = 0010010000000100  0000000000010001 / 0010000010000100  0000000000010001
SY7 = 0010010001000100  0000000000010001 / 0010010000000100  0000000000010001
```

STATES 3 AND 4

```
        (MSB)                    (LSB)  /  (MSB)                    (LSB)
SY0 = 1001001000000100  0000000000010001 / 1001001001000100  0000000000010001
SY1 = 1000010001000100  0000000000010001 / 1000010000000100  0000000000010001
SY2 = 1001000001000100  0000000000010001 / 1001000000000100  0000000000010001
SY3 = 1000010010000100  0000000000010001 / 1000010000000100  0000000000010001
SY4 = 1000100001000100  0000000000010001 / 1000100000000100  0000000000010001
SY5 = 1000100100000100  0000000000010001 / 1000000100000100  0000000000010001
SY6 = 1001000000100100  0000000000010001 / 1000000001000100  0000000000010001
SY7 = 1000100001000100  0000000000010001 / 1000000010000100  0000000000010001
```

FRAME

| ZONE | RADIUS LENGTH r(mm) | NUMBER OF RECORDING AND REPRO-DUCTION UNITS | ZONE CAPACITY (KB) |
|---|---|---|---|
| ZONE 0 | 24.00 | 68 | 2228 |
| ZONE 1 | 24.04 | 68 | 2228 |
| ⋮ | ⋮ | ⋮ | ⋮ |
| ZONE 814 | 57.86 | 164 | 5374 |

FIG. 16

| ZONE NO. | BLOCK NO. | SECTOR NO. | FRAME COUNT / ZONE | TRACK NO. | FRAME COUNT / TRACK |
|---|---|---|---|---|---|
| 0 | 0 | 0 | 0 | 0 | 0 |
| 0 | 1 | 16 | 442 | 0 | 442 |
| 0 | 2 | 32 | 884 | 1 | 306 |
| 0 | 3 | 48 | 1326 | 2 | 170 |
| 0 | 4 | 64 | 1768 | 3 | 34 |
| 0 | 5 | 80 | 2210 | 3 | 476 |
| ⋮ | ⋮ | ⋮ | ⋮ | ⋮ | ⋮ |
| 0 | 66 | 1056 | 29172 | 50 | 272 |
| 0 | 67 | 1072 | 29614 | 51 | 136 |
| 1 | 0 | 1088 | 0 | 52 | 0 |
| 1 | 1 | 1104 | 442 | 52 | 442 |
| 1 | 2 | 1120 | 884 | 53 | 305 |
| 1 | 3 | 1136 | 1326 | 54 | 168 |
| 1 | 4 | 1152 | 1768 | 55 | 310 |
| 1 | 5 | 1168 | 2210 | 55 | 473 |
| ⋮ | ⋮ | ⋮ | ⋮ | ⋮ | ⋮ |
| 1 | 66 | 2144 | 29172 | 102 | 222 |
| 1 | 67 | 2160 | 29614 | 103 | 85 |
| 2 | 0 | 2176 | 0 | 103 | 527 |
| 2 | 1 | 2192 | 442 | 104 | 389.9 |
| 2 | 2 | 2208 | 884 | 105 | 251.9 |
| 2 | 3 | 2224 | 1326 | 106 | 113.9 |
| 2 | 4 | 2240 | 1768 | 106 | 555.9 |
| ⋮ | ⋮ | ⋮ | ⋮ | ⋮ | ⋮ |
| 813 | 162 | 1705056 | 71604 | 44327 | 58.1 |
| 813 | 163 | 1705072 | 72046 | 42327 | 500.1 |
| 814 | 0 | 1705088 | 0 | 42327 | 942.1 |
| 814 | 1 | 1705104 | 442 | 42327 | 1384.8 |
| 814 | 2 | 1705120 | 884 | 42328 | 434.8 |
| 814 | 3 | 1705136 | 1326 | 42328 | 876.8 |
| 814 | 4 | 1705152 | 1768 | 42328 | 1318.8 |
| 814 | 5 | 1705169 | 2210 | 42328 | 368.8 |
| ⋮ | ⋮ | ⋮ | ⋮ | ⋮ | ⋮ |
| 814 | 162 | 1707680 | 71604 | 42379 | 162.8 |
| 814 | 163 | 1707696 | 72046 | 42379 | 604.8 |

ASYMMETRY COMPENSATION APPARATUS AND REPRODUCTION APPARATUS FOR RECORDABLE DISC

BACKGROUND OF THE INVENTION

1. Field of the Invention

The present invention relates to an asymmetry compensation apparatus for applying asymmetry compensation to a reproduced signal, provided, for example, for a reproduction apparatus for disc-shaped recording media.

2. Description of the Related Art

Conventionally, a so-called asymmetry phenomenon is generated in recording pits ("recording pits" here refer to recording marks formed by magneto-optical recording and phase-change recording as well as physically formed holes as in a compact disc (CD)) formed on a disc-shaped recording medium (hereinafter just called a disc) due to changes in various conditions during recording. This asymmetry adversely affects reproduced data so as to generate an error in the length of each inverted period, and may cause inappropriate data reproduction processing.

Therefore, for compensating for such asymmetry, there has been known an asymmetry compensation circuit shown in FIG. 17.

The asymmetry compensation circuit shown in the figure compensates for asymmetry while it makes an analog reproduced RF signal read from a disc to a binary RF signal (EFM signal in a CD system).

The reproduced RF signal is input to an non-inverted input terminal of a comparator 50 through a coupling capacitor C10. A voltage division point at which a DC power source line voltage is divided by resistors R20 and R21 is also connected to the non-inverted input terminal of the comparator 50.

The comparator 50 compares the level of the reproduced RF signal input to the non-inverted input terminal with a threshold TH input to an inverted input terminal of the comparator to generate and output the binary RF signal. This binary RF signal is sent to a required decoding processing circuit system at the subsequent stage. The binary RF signal also branches to be input to a filter section 51 for asymmetry compensation.

The filter section 51 serves as a low-pass filter (integrator) and provided with a first stage filter formed of a resistor R22 and a capacitor C11 and a second filter formed of a resistor R23 and a capacitor C12. The filter section 51 has the certain time constant determined by the resistances and the capacitances of these elements.

The filter section 51 filters the input binary RF signal and sends it to an amplifier 52. If asymmetry causes an error (dispersion) in the length of the inverted period of the binary RF signal, the filter section 51 outputs the DC component having the level corresponding to this error.

Since the output of the filter section 51 is input to the inverted input terminal of the comparator 50 through the amplifier 52 as the threshold TH, the threshold TH varies according to the effect of the asymmetry. With this threshold TH being input, the comparator 50 performs a converging operation such that the binary RF signal in which the effect of asymmetry is canceled is output.

In recent years, a disc called a digital versatile disc ROM or a digital video disc ROM (DVD-ROM) has been developed as an optical-disc recording medium suited to multimedia use. There also have been proposed a rewritable recording medium which is compatible with this DVD-ROM and which does not make the configuration of a recording and reproduction apparatus complicated, and a recording and reproduction system therefor.

In such a recording and reproduction system for a rewritable medium, the minimum recording unit of data is specified in a format. For example, as shown in FIG. 18A, data is written in units of blocks, which serve as the minimum units of recording data. In the figure, data is continuous in the order of Block (N−1), Block (N), and Block (N+1). To avoid overlap between the last data of the preceding block and the first data of the current block, a link area having the specified size, called a linking section, is provided.

According to such a format, a recording sequence from the start of data recording to the end is completed in units of blocks at the minimum length.

Assume that data is recorded not continuously but by different recording sequences in Block (N−1), Block (N), and Block (N+1) in FIG. 18A.

In this case, since recording is performed for Block (N−1), Block (N), and Block (N−1) at different chances, each block may be recorded by a different driver. Even if the same driver is used, an error in laser power in recording or an environment change such as a change in the ambient temperature can be considered.

When data recorded on the same disc with different recording conditions such as described above is reproduced, a characteristic difference such as a change in the amplitude level of a reproduced RF signal is generated between blocks. FIG. 18B roughly shows a reproduced RF signal obtained by reproducing the data shown in FIG. 18A. The width W in the up and down directions of the signal indicates its amplitude level. It is understood from the figure that the amplitude level of a reproduced RF signal may change between blocks if Block (N−1), Block (N), and Block (N+1) are recorded by different recording sequences.

When the asymmetry compensation circuit having the configuration shown in FIG. 17 is applied to a system in which data is substantially sequentially recorded in a medium, such as a CD system, there occurs no problem if the time constant of the filter section 51 is fixed. On the other hand, if the asymmetry compensation circuit having the configuration shown in FIG. 17 is applied to a case in which the reproduction state shown in FIG. 18B is generated, although the ideal threshold TH should be as shown by a solid line in FIG. 18B, since the filter section 51 has a fixed time constant, the threshold level actually does not respond such swiftly and changes to the threshold level TH appropriate for Block (N) with some time difference as shown by a dotted line "a" when reproduction proceeds from Block (N−1) to Block (N). In this case, a binary RF signal for which appropriate asymmetry compensation is not performed is output during the period indicated by the dotted line "a." This means that reliability of read data deteriorates accordingly.

SUMMARY OF THE INVENTION

Accordingly, it is an object of the present invention to improve data-reproduction reliability by applying asymmetry compensation to a reproduced signal read from a disc, namely, by always using an appropriate threshold for producing a binary signal.

The above object is achieved in one aspect of the present invention through the provision of an asymmetry compensation apparatus including: input level detecting means for making a detection signal obtained by comparing the level of a reproduced signal read from a disc-shaped recording medium with a threshold to a binary signal and for outputting the binary signal as a reproduced data signal; asymmetry compensation means provided with a low-pass filter to which the detection signal is input from the input level detecting means, for compensating for asymmetry generated in the reproduced data signal by inputting as the threshold the output of the low-pass filter to the input level detecting means; signal state detecting means for detecting a state in which the state of the reproduced signal matches the specified condition; and time constant changing means for controlling such that the time constant of the low-pass filter is changed at the specified timing when the signal state detecting means detects a state in which the state of the reproduced data signal matches the specified condition.

In the asymmetry compensation apparatus, the time constant changing means may change the time constant of the low-pass filter according to a change in the state of the reproduced signal detected by the signal state detecting means such that the threshold changes so as to allow higher speed tracking than in the standard case.

In the asymmetry compensation apparatus, the time constant changing means may change the time constant of the low-pass filter according to a change in the state of the reproduced signal detected by the signal state detecting means such that the preceding threshold is substantially maintained during the specified period.

According to the above configuration, depending on the states of a reproduced signal read from a disc-shaped recording medium and the reproduced data obtained by demodulating the reproduced signal, the time constant of the low-pass filter constituting the asymmetry compensation apparatus, in the analog RF signal binarization circuit is changed. Therefore, it is possible to always set the threshold appropriately according to the state of a reproduced signal, by setting the time constant of the low-pass filter small in a period such that the output responds to the input at a higher speed and by setting the time constant of the low-pass filter large in another period such that the preceding threshold (output of the low-pass filter) is maintained, according to the signal state.

As described above, according to the present invention, in an asymmetry compensation apparatus for compensating for asymmetry generated in a reproduced data signal, by inputting as a threshold the output of a low-pass filter to which a detection signal obtained by comparing the level of a reproduced signal read from a disc-shaped recording medium with the threshold is input as a binary reproduced data signal, the time constant of the low-pass filter is changed according to the state of the reproduced signal.

With this configuration, in a case in which the link area of a data recording unit which may serve as a recording start position in a series of sequence is reproduced, or in a case in which a state where a reproduced signal is missing is detected, the time constant of the low-pass filter can be reduced at the specified timing to increase the transmission speed or the time constant can be increased to control such that the preceding output of the low-pass filter is maintained. Irrespective of a change in the signal state, an almost appropriate threshold (the output of the low-pass filter) is always obtained. In other words, an appropriate asymmetry compensation operation is always obtained irrespective of the signal state, and thereby more highly reliable data reproduction is implemented.

The above object is achieved in another aspect of the present invention through the provision of a reproduction apparatus for reproducing data by making a reproduced RF signal read from a disc-shaped recording medium to a binary signal and for applying the specified demodulation processing to the binary signal, including: a waveform processing circuit for producing a binary signal by comparing the reproduced RF signal with a threshold; and a demodulation circuit for demodulating the binary RF signal, the waveform processing circuit having: comparing means for comparing the reproduced RF signal with the threshold; and filter means for receiving the output signal of the comparing means and for changing a time constant according to the reproduction position on the disc-shaped recording medium where the reproduced RF signal is detected.

BRIEF DESCRIPTION OF THE DRAWINGS

FIG. 13 is a view of frame synchronization patterns.

FIG. 16 is a view of the contents of a ROM table stored in the recording and reproduction apparatus.

DESCRIPTION OF THE PREFERRED EMBODIMENT

Figure 1:
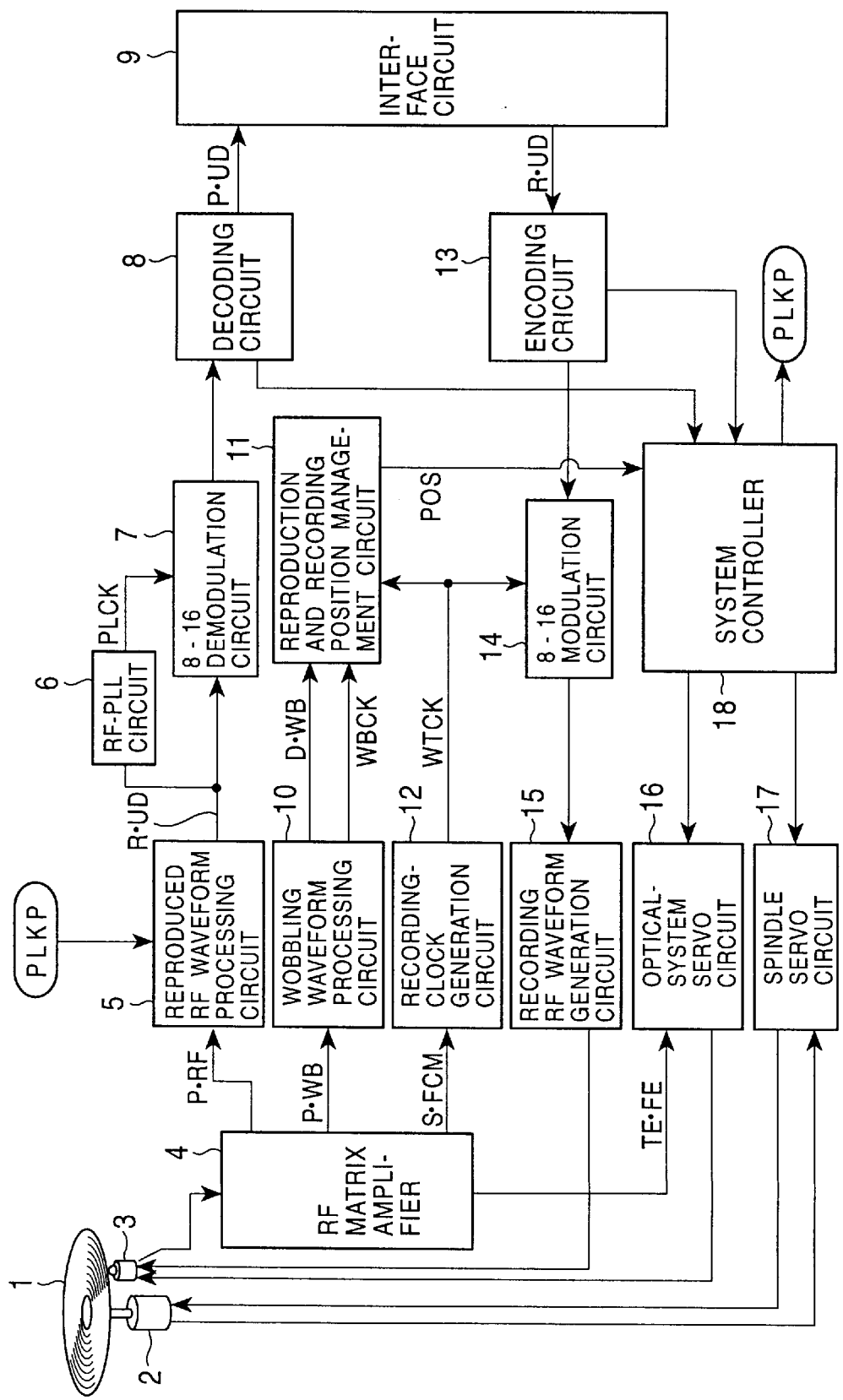
FIG. 1 is a block diagram of a recording and reproduction apparatus according to an embodiment of the present invention.

An embodiment of the present invention will be described below by referring to FIGS. 1 to 13. The following items will be described in the following order.
1. Physical format of optical disc
2. Logical format of optical disc
3. Zone format
4. Configuration of recording and reproduction apparatus
5. Configuration of reproduced RF waveform processing circuit 6. Asymmetry compensation operation according to the present embodiment
7. Asymmetry compensation operation for DVD-ROM drive 1. Physical format of optical disc An optical disc used in the present embodiment is compatible with a DVD-ROM and is rewritable in phase-change data recording. The physical format of the optical disc will be first described below by referring to FIGS. 6 to 9.

Tracks are formed in advance by grooves on the optical disc and physical addresses are expressed by wobbling the grooves. Detailed description is omitted here. Since a groove is wobbled by a signal obtained by frequency-modulating an address, reproduction information from the groove is frequency-demodulated to extract the absolute address.

The disc is rotated by the constant angular velocity (CAV) method and the absolute addresses in the grooves are CAV data accordingly.

For this optical disc, a groove recording method is employed (a land is not used for recording), and a track pitch is set to a distance between the center of a groove to that of an adjacent groove in the track width direction.

Data is recorded at a constant linear density (CLD). A certain width is set for a linear density zone and a great number of zones are actually set to make the linear density of the whole disc substantially constant. In the present specification, this is called a zoned constant linear density (zoned CLD). A so-called 8-16 modulation is employed as a recording-data modulation method in the same way as for a DVD, and mark-edge recording is performed on a phase-change recording medium.

Figure 6A:
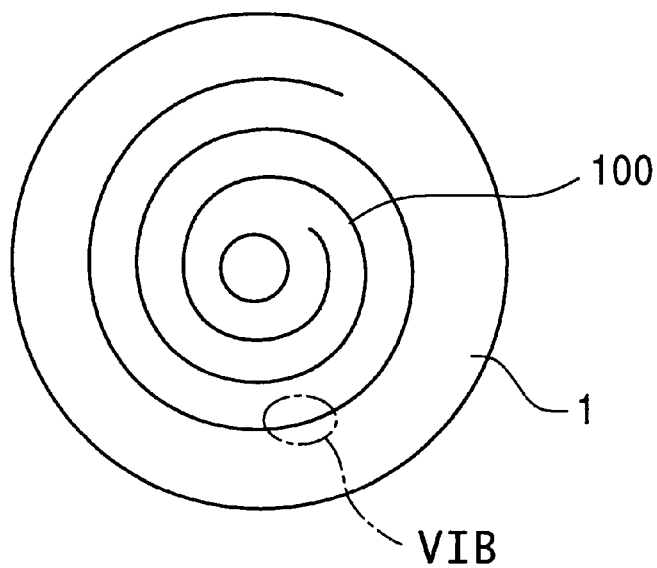
FIGS. 6A and 6B are views of wobbling pre-grooves on a disc according to the present embodiment.
Figure 6B:
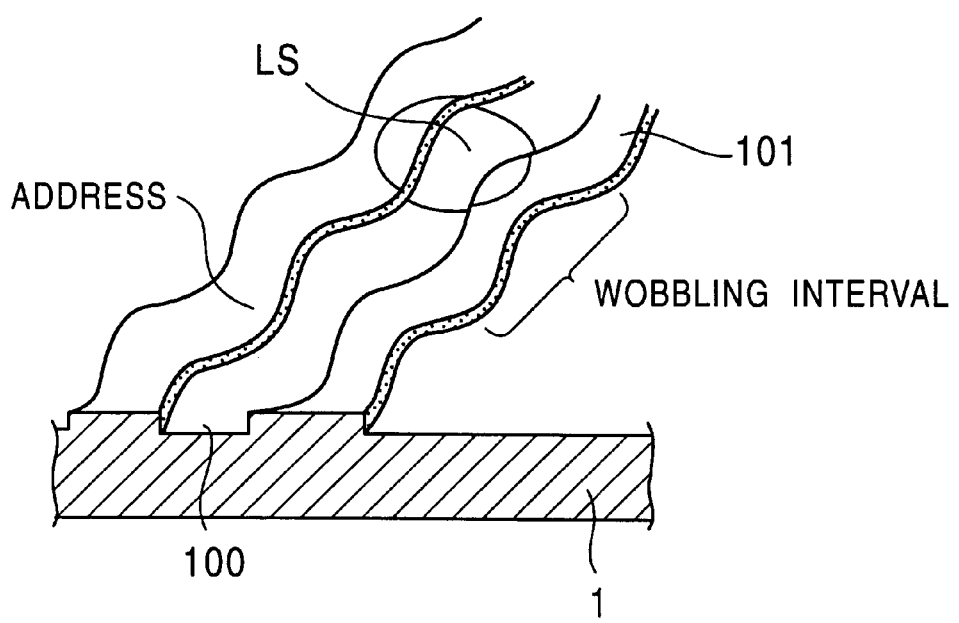

FIGS. 6A and 6B show a groove structure example of the optical disc. As shown in FIG. 6A, a pre-groove 100 is formed in advance spirally from the inward to the outward in a groove area of the disc 1. It is a matter of course that the pre-groove 100 can be formed concentrically.

As shown in FIG. 6B, in which a part of the pre-groove 100 is enlarged, the right and left side walls thereof are wobbled according to address information. In other words, the pre-groove is wobbled at the certain interval corresponding to a wobbling signal generated according to an address. A land 101 is formed between paths of the pre-groove 100 and data is recorded in the pre-groove 100.

In the disc 1, for example, a wobbling amplitude is actually set to about 12.5 nm. An amount of wobbling is set large instantaneously at a certain interval on the pre-groove, which is called a fine clock mark, described later. A wobbling amplitude is about 25 to 30 nm at the mark.

Figure 7:
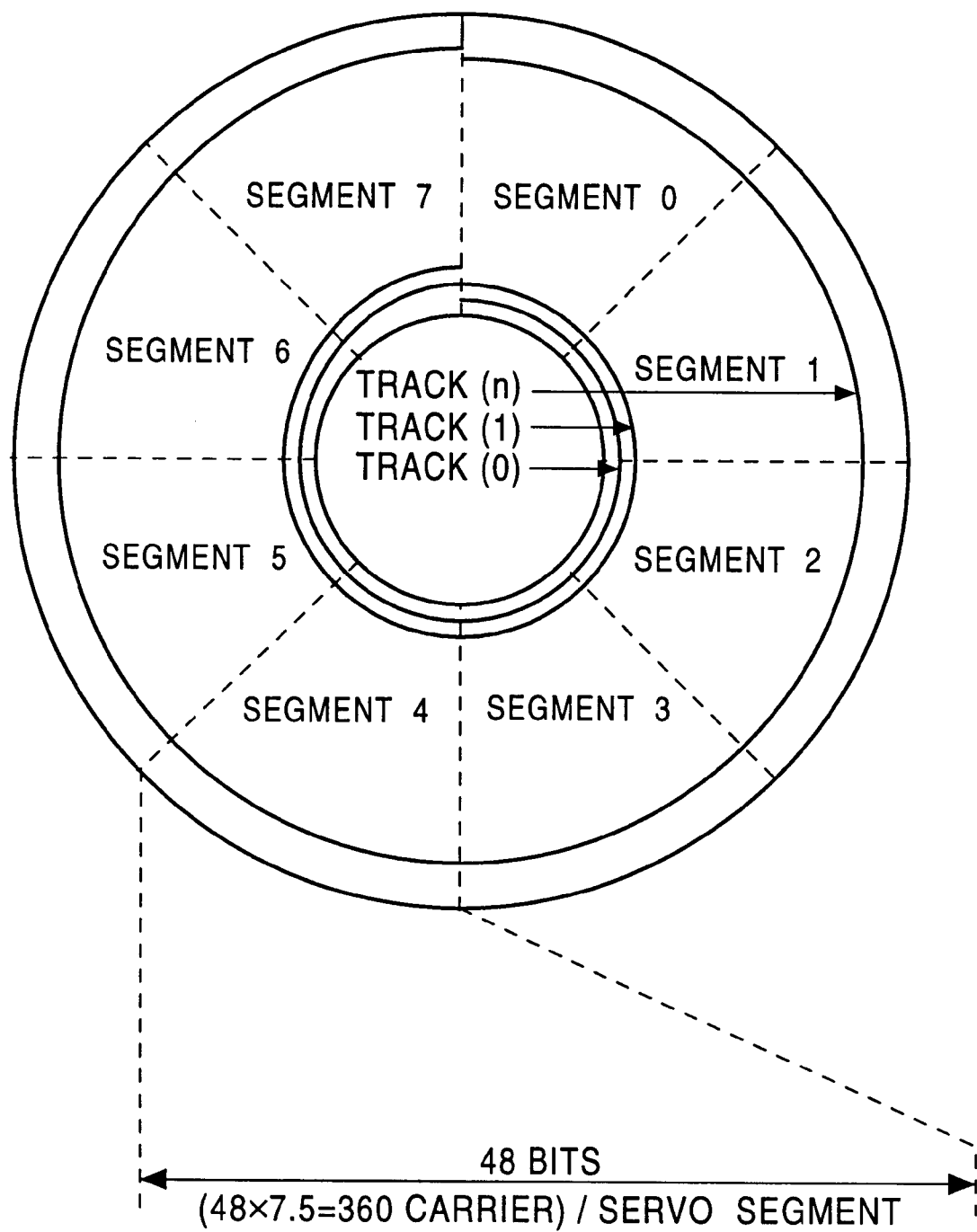
FIG. 7 is a view of a wobbling-address CAV format according to the present embodiment.

One track (one turn of track) has a plurality of wobbling address frames. The wobbling address frames are divided into eight sections in the rotation direction of the disc as shown in FIG. 7 and each section is called a servo segment (segment 0 to segment 7). One servo segment (hereinafter called just a segment) includes 48-bit information having an absolute address as a main component and one segment corresponds to 360 wobbling waves. In each wobbling address frame, which corresponds to each segment (segment 0 to segment 7), 48-bit wobbling data is frequency-modulated to form a wobbling groove.

The fine clock marks are formed at an equal interval on a wobbling groove and are used for generating a reference clock in a phase-locked loop (PLL) for data recording. Per one disc rotation, 96 fine clock marks are formed. Therefore, 12 fine clock marks are formed in each segment.

Figure 9:
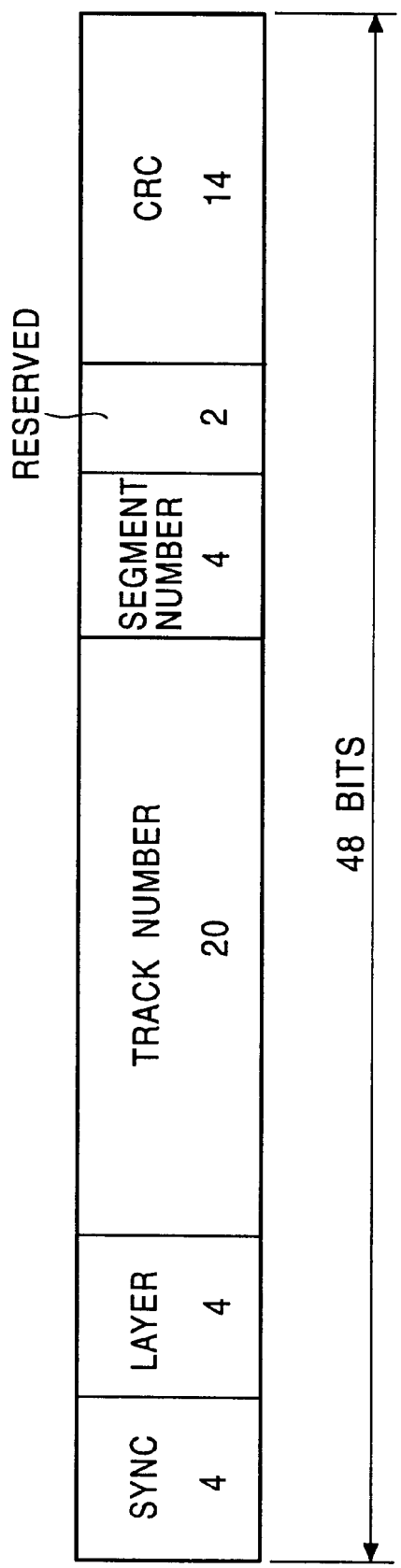
FIG. 9 is a view of a frame structure of a wobbling address in the disc according to the present embodiment.

A wobbling address frame in each segment (segment 0 to segment 7) has a structure shown in FIG. 9.

In a 48-bit wobbling address frame, the first four bits are assigned to a synchronizing signal (sync) indicating the start of the wobbling address frame. This four-bit synchronizing pattern is bi-phase data in which four-bit data is formed by eight channel bits.

The next four bits indicate layer information which represents the current layer among a plurality of recording layers or the layer structure of the disc.

The next 20 bits indicate a track address (track number) serving as an absolute address on the disc.

The next four bits indicate a segment number. The segment number is one of 0 to 7 corresponding to the segment 0 to the segment 7. The segment number represents a circumferential position of the disc.

The next two bits are reserved. The last 14 bits of the wobbling address frame indicate an error detection code (cyclic redundancy check: CRC).

As described above, fine clock marks are formed at an equal interval in a wobbling address frame.

Figure 8:
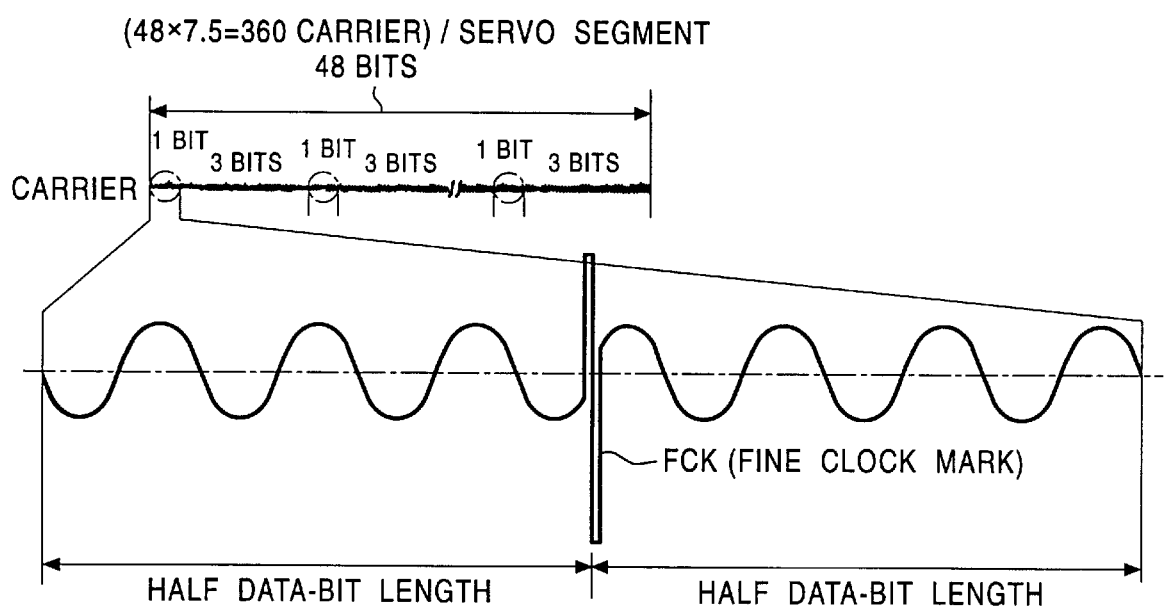
FIG. 8 is a view of a segment of a wobbling address in the disc according to the present embodiment.

FIG. 8 shows fine clock marks. Data of 48 bits is stored in each wobbling address frame. As shown in FIG. 8, assuming that each bit is formed of seven waves (carriers) of a signal having a certain frequency, one frame includes 360 waves.

When the disc 1 is rotated at a speed of 1939 times per minute, the carrier frequency becomes 93.1 kHz.

As shown in FIG. 8, one bit is assigned to a fine clock mark in every four bits of address information in the wobbling address frame shown in FIG. 9. In other words, a fine clock mark is superposed on one bit at an interval of four bits.

The first one bit of a four-bit block includes a fine clock mark, and the remaining three bits do not contain a fine clock mark. In FIG. 8, a bit including a fine clock mark is enlarged and shown at the bottom. As shown in the figure, a waveform representing a fine clock mark FCK is included at the center of a data bit length.

In the pre-groove 100 on the disc 1, the wobbling amplitude instantaneously becomes, for example, about 30 nm at the portion corresponding to the fine clock mark FCK.

In one frame, 12 fine clock marks are recorded in every four bits. Therefore, 96 (=12×8) fine clock marks are recorded in one rotation (one track).

These fine clock marks (the PLL clock generated from the fine clock marks in a recording and reproduction apparatus) show circumferential positions more precisely than the segment numbers.

The carrier frequency of each data in 48 bits is set correspondingly to the data. Each data such as a track number is bi-phase modulated and then is frequency modulated. The pre-grooves are wobbled by this frequency-modulated wave.

2. Logical format of optical disc

A logical format of recording data will be described below by referring to FIGS. 10 to 13.

Figure 10:
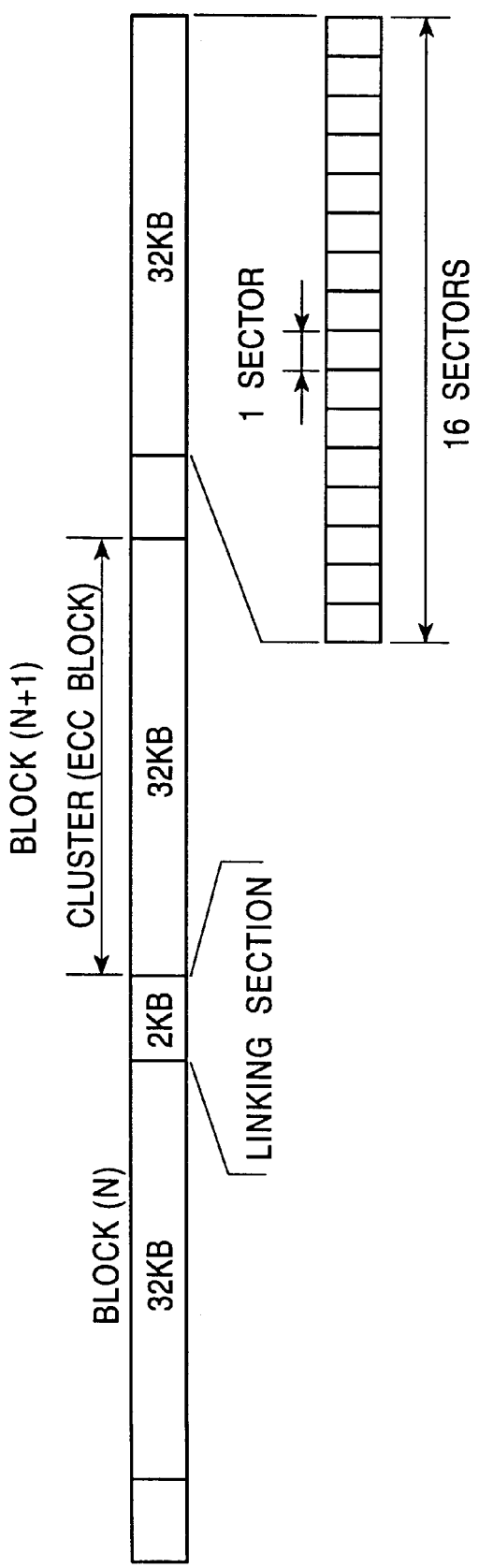
FIG. 10 is a view of a structure of data to be recorded in the disc according to the present embodiment.

In the disc corresponding to the present embodiment, data is recorded in units of clusters each of which is formed of 32K bytes as shown in FIG. 10. This 32K bytes are also handled as an ECC block (hereinafter called just a block). This block is used to form an error correction block and serves as a unit of 32K-byte data to which an error correction code is attached. One block is formed of 16 sectors.

Figure 11:
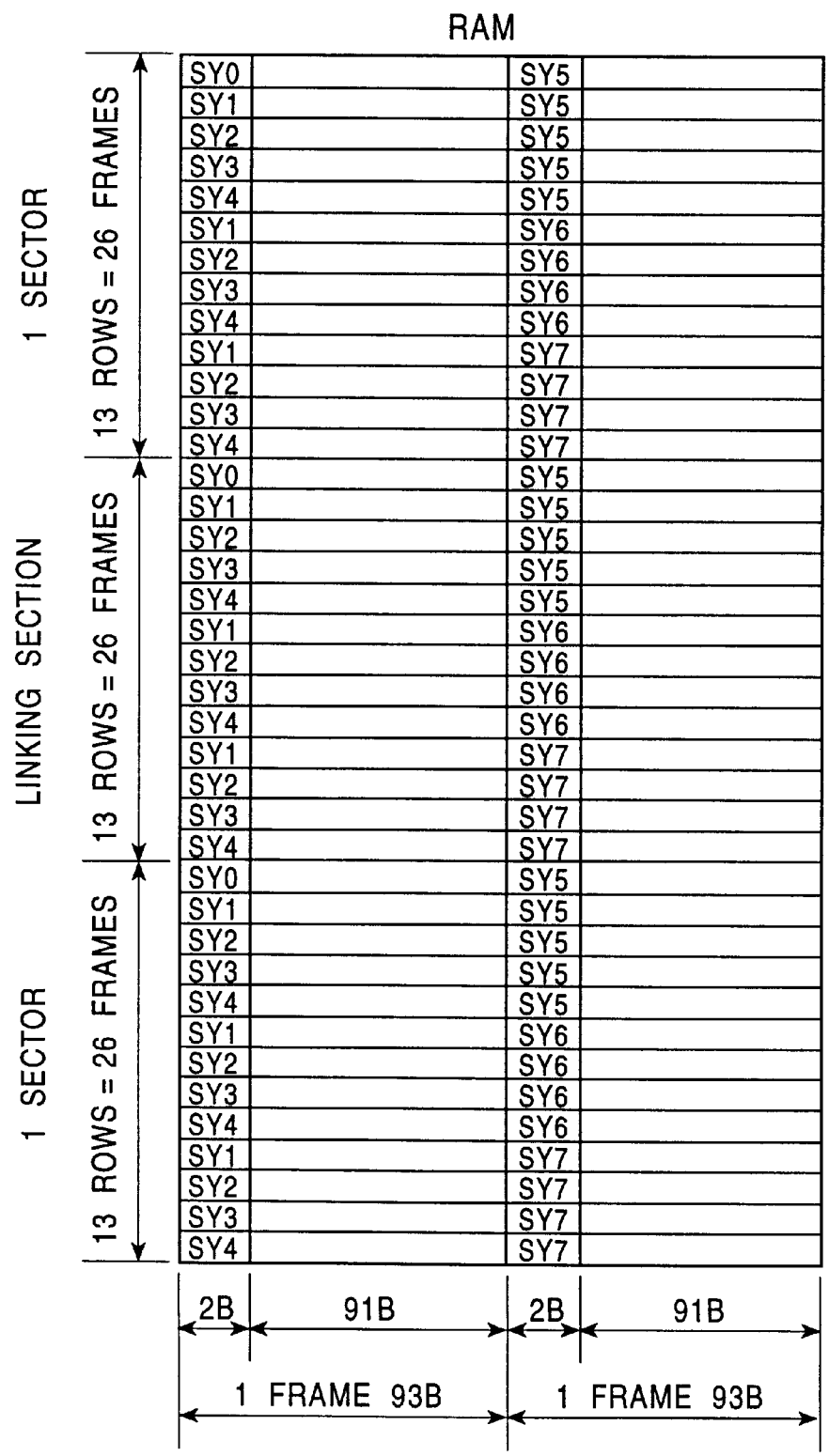
FIG. 11 is a view of a frame structure in a sector.

A sector structure is shown in FIG. 11. One sector is formed of 13 rows, which is equal to 26 frames. One frame is formed so as to divide one row of 186 bytes into two groups of 93 bytes as shown in the figure. At the top of each frame, a two-byte frame synchronizing signal (SY0 to SY7) is attached and 91-byte data follows this frame synchronizing signal. Frame synchronizing signals are disposed at the top positions of the 26 frames in the order of SY0, SY5, SY1, SY5, SY2, SY5, ..., SY3, SY7, SY4, and SY7 as shown in the figure.

Figure 12:
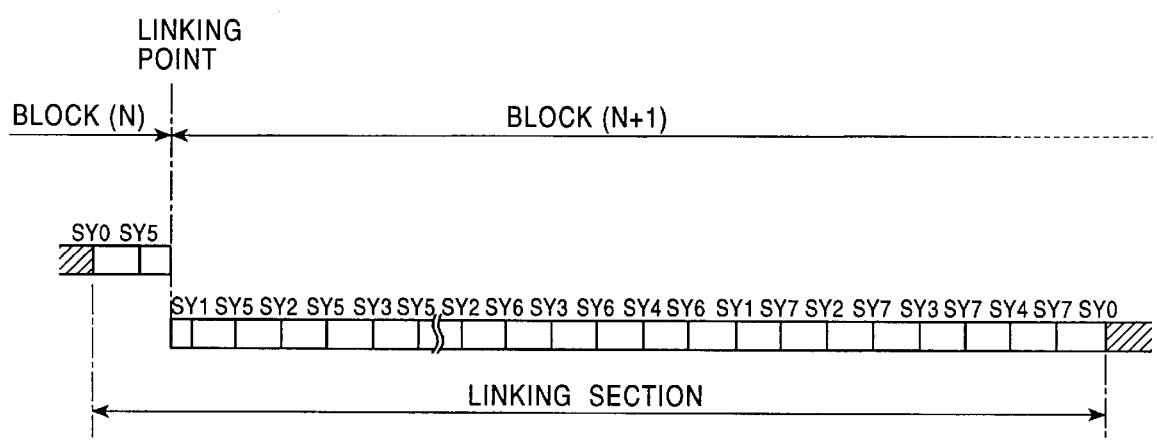
FIG. 12 is a view of a frame structure in a linking section.

Between blocks, a 2K-byte linking section (data in a link area) is disposed. More correctly, as shown in FIG. 12, a part of data in a linking section, which is formed of 26 frames, is recorded at the end of the preceding cluster and the rest is recorded in the top of the current cluster. In other words, the linking section is actually formed so as to be divided at a linking point in the end of a recording operation for a cluster serving as a block (N) and the start of a recording operation for a cluster serving as a block (N+1). This 2K-byte linking section is formed of 26 frames, which is the same size as one sector.

It is understood from FIG. 11 that the data structure of a linking section is the same as a sector in which block data is stored, in the view of frame synchronizing signal setting. In FIG. 12, the structure of a linking section is indicated by the types (SY0 to SY7) of synchronizing signals in each frame. The contents of data in a linking section is omitted here.

FIG. 13 shows examples of frame synchronizing signals SY0 to SY7. Although a frame synchronizing signal has two-byte data, since converted channel bit data is shown in the examples, each frame synchronizing signal has a data length of 32 bits (four bytes).

For example, SY0 has four states, state 1 to state 4. When it is added to frame data of 91 bytes, data of a certain state is selected such that a digital sum value (DSV) becomes the minimum and added as a frame synchronizing signal.

It is understood from FIG. 13 that a 14T inverted period is provided at bit positions (the fourteenth bit to the twenty-eighth bit) common to all signals in the bit pattern of each frame synchronizing signal. A frame synchronizing signal can be identified by monitoring this 14T inverted period.

In a ROM disc such as a DVD-ROM compatible with the disc in the present embodiment, a linking section is not disposed. Even in such a ROM disc, one sector is formed of 13-row data, namely, 26 frames, and a frame synchronizing signal (SY0 to SY7) having the same pattern as that shown in FIG. 11 is added at the top of each frame.

With such a structure, a RAM disc can be reproduced by a reproduction apparatus dedicated to a ROM disc.

In other words, in a reproduction apparatus dedicated to a ROM disc, when eight frame synchronizing signals SY1, SY7, SY2, SY7, SY3, SY7, SY4, and SY7 stored in the tenth row to the thirteenth row of a data block are detected, the next data is recognized as the top of a data block. Therefore, by storing the eight frame synchronizing signals in a link area, the reproduction apparatus can recognize the top of a data area following the link area.

3. Zone format

In the disc corresponding to the present embodiment, the zoned CLD method, which uses a great number of zone divisions, is employed. A zone format will be described below by referring to FIG. 14, FIG. 15, and FIG. 16.

Figure 15:
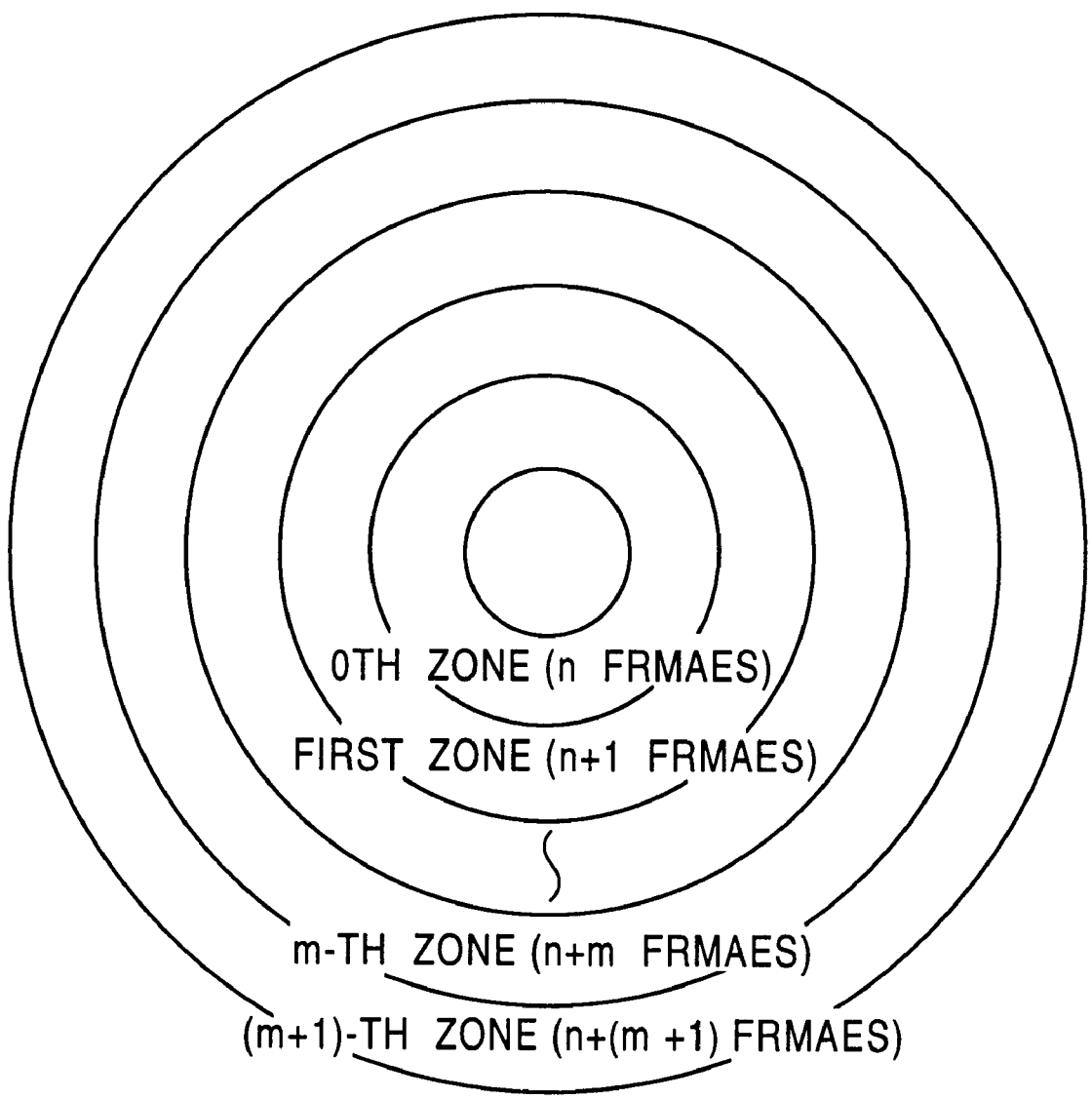
FIG. 15 is a view of a zone structure in the disc according to the present embodiment.
Figure 17:
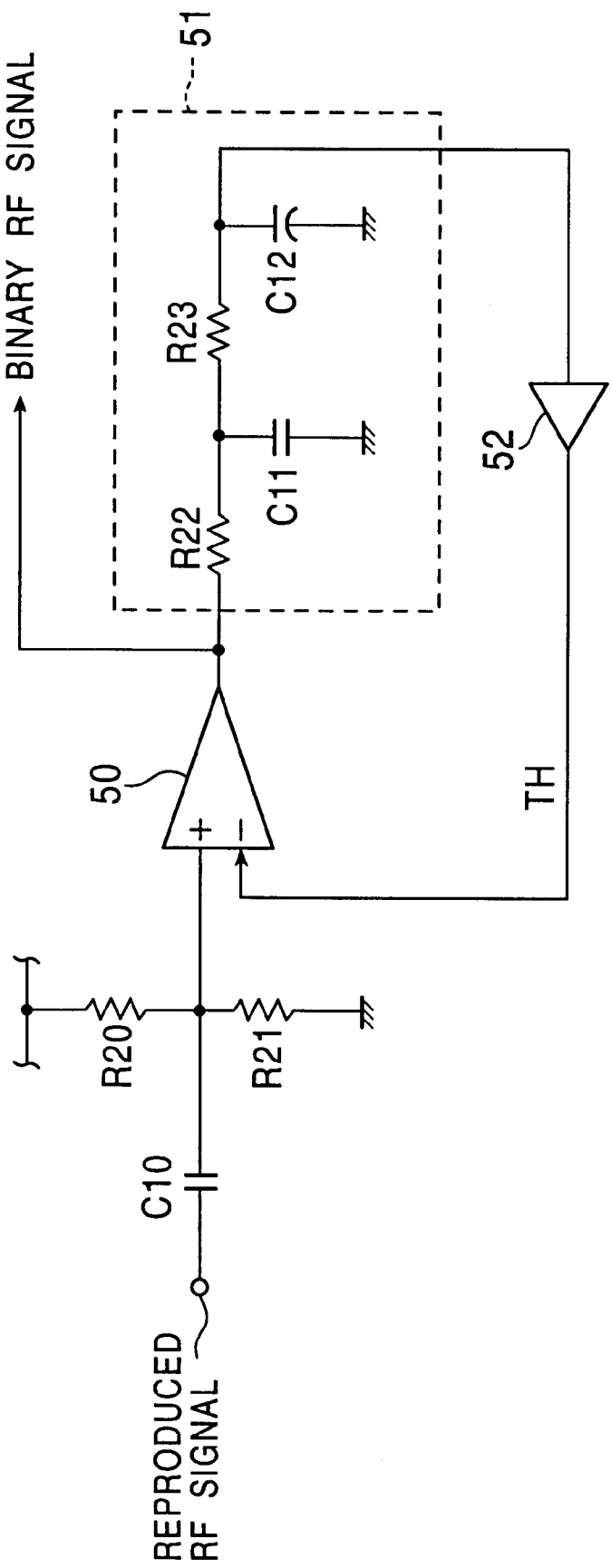
FIG. 17 is a circuit diagram of a conventional asymmetry compensation circuit.

As shown in FIG. 15, the disc 1 is divided into a plurality of zones (in this example, (m+2) zones from the 0th zone to the (m+1)-th zone) for data recording and reproduction.

The 0th zone has n data frames (a data frame differs from the address frame shown in FIG. 9 and is a unit of data block described by referring to FIG. 11) in one track. The first zone has (n+1) data frames in one track. An outer zone has more data frames than the adjacent inner zone by one frame. The m-th zone has (n+m) data frames, and the outermost (m+1)-th zone has (n+(m+1)) data frames.

A zone boundary is disposed at a radius position where a capacity of (n+1) frames is obtained at the same innermost line density as the preceding zone. In other words, the first zone starts at a radius position where a capacity of (n+1) frames is obtained at the same line density as the innermost line density of the 0th zone. In the same way, the m-th zone starts at a radius position where a capacity of (n+m) frames is obtained at the same density as the innermost line density of the 0th zone.

Figure 14:
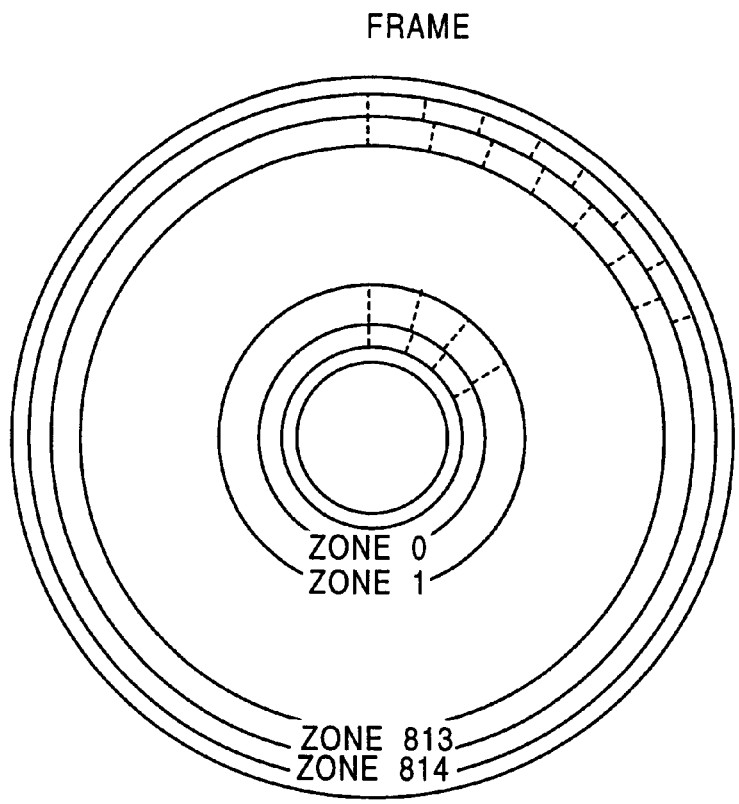
FIG. 14 is a view of a zone structure in the disc according to the present embodiment.

Specifically, when an area having a radius position of 24 to 58 mm is set to a recordable area, a track pitch is set to 0.8 $\mu$m, and a line density is set to about 0.351 $\mu$m/bit in the disc 1 having a diameter of 120 mm, the recordable area is divided into 815 zones from the 0th zone to the 814th zone as shown in FIG. 14.

The 0th zone, which starts at a radius position of 24 mm, has 578 frames per track (one rotation). As the zone number is incremented by one, one frame is increased in each track.

As described above, in the present embodiment, since one sector is formed of 26 frames (data frames), the number (=1) of frames incremented in each zone is set to a value smaller than the number (=26) of frames constituting one sector. Many zones can be formed in smaller units and the capacity of the disc 1 can be extended. This method is called the zoned constant linear density (CLD) method.

In the CLD method, a clock frequency needs to be linearly changed according to a radius position in the disc. It is actually difficult (but not impossible) to perform such control. Therefore, in the present embodiment, the clock frequency is changed in several stages in the same method as the zone CAV method. Since the area is divided into a great number of zones such as 815 zones, a change in the linear density in a zone is suppressed to implement the zoned CLD method as a result, in which the linear density is substantially constant.

In a case in which the above-described format is used, a table can be formed which shows relationships among sector numbers, zone numbers, ECC-block numbers, frame counts per zone, track numbers, and frame counts per track, as shown in FIG. 16.

In the present embodiment, the table shown in FIG. 16 is stored in a ROM inside a system controller 18 of the recording and reproduction apparatus. By referring to recording and reproduction position management information POS on the disc which can be detected from a decoded wobbling address frame, described later, and the contents of the table, the timing of a linking point can be detected.

4. Configuration of recording and reproduction apparatus

FIG. 1 is a block diagram of a main section of a recording and reproduction apparatus which is provided with an symmetry compensation circuit (reproduced RF waveform processing circuit) according to an embodiment of the present invention and which can perform recording and reproduction correspondingly to the disc format described above.

The disc 1, which is a recording medium in the format described by referring to FIGS. 6 to 16, is rotated by a spindle motor 2 at a certain constant angular velocity (CAV) in a recording or reproduction operation. A spindle servo circuit 17 applies rotation-speed servo control to the spindle motor 2.

An optical head 3 emits laser light to the rotating disc 1. The optical head 3 is provided with a laser light source, such as a laser diode or a laser coupler, an optical system formed of various lenses and a beam splitter, an objective serving as the output end of laser light, a detector for detecting reflected light from the disc, a two-axis mechanism for movably holding the objective in a tracking direction and in a focus direction, and in addition, a sled mechanism (not shown) for moving the optical head 3 in the disc radial direction.

The recording and reproduction apparatus according to the present embodiment employs the phase-change recording method for the disc as described above. Therefore, in recording, the optical head 3 emits laser light in which a laser pulse having a certain recording level is superposed on a deletion level slightly smaller than the recording level to perform recording on the phase-change disc. In reproduction, laser light having a reproduction level which is smaller than the deletion level is emitted to the disc 1 and reflected light is detected by a detector to obtain reproduction information.

An RF matrix amplifier 4 is provided with a current/voltage conversion circuit, an amplifying circuit, and a matrix calculation circuit, and generates necessary signals, such as a reproduced RF signal P·RF, which is an analog reproduced-data signal, a focus error signal FE used for servo control, and a tracking error signal TE, according to the detection signal of the detector in the optical head 3. Furthermore, in the present embodiment, from read information concerning wobbling included in the detection signal of the detector in the optical head 3, a wobbling reproduction signal P·WB, including wobbling address information, and a fine clock mark signal S·FCM obtained by detecting a fine clock mark formed on wobbling are extracted and generated.

The reproduced RF signal P·RF is input to a reproduced RF waveform processing circuit 5. Asymmetry compensation is applied and the reproduced RF signal P·RF is converted to a binary signal and output as reproduced RF data D·RF. The internal configuration of the reproduced RF waveform processing circuit 5 will be described later.

The reproduced data D·RF is sent to both RF-PLL circuit 6 and 8-16 demodulation circuit 7. The RF-PLL circuit 6 generates a reproduction clock PLCK in synchronization with the channel bit frequency of the input reproduced RF data D·RF. This reproduction clock PLCK is used as a reference clock in reproduction signal processing and is input to the 8-16 demodulation circuit 7 to serve as a signal-processing timing reference in the 8-16 demodulation circuit 7.

The 8-16 demodulation circuit 7 applies so-called 8-16 demodulation processing to the input reproduced RF data D·RF and sends to a DVD-data decoding circuit 8. The DVD-data decoding circuit applies error correction processing to the 8-16 demodulation data to which 8-16 demodulation processing has been applied. In addition, the DVD-data decoding circuit 8 converts (demodulates) data modulated to have a format conforming to the DVD format to data having a format conforming to user data and sends it to an interface circuit 9 as a reproduced user data P·UD. The DVD-data decoding circuit 8 can also supply required reproduced data processing information related to a reproduced data processing result to a system controller 18.

The interface circuit 9 is connected to a data processing apparatus (not shown) such as a host computer, and transfers the reproduced user data P·UD and recording user data R·UD between the recording and reproduction apparatus and the host computer.

A wobbling waveform processing circuit 10 applies required demodulation processing such as FM demodulation processing to the input wobbling reproduction signal P·WB to generate the wobbling reproduction data D·WB corresponding to the data shown in FIG. 9 and a clock WBCK for the wobbling reproduction data, which has the frequency corresponding to the wobbling interval, and sends them to a reproduction and recording position management circuit 11.

A recording-clock generation circuit 12 is provided with a PLL circuit. The fine clock mark signal S·FCM is input to the PLL circuit to generate and output a recording clock WTCK used for data recording. The recording clock WTCK is input to a 8-16 modulation circuit 14 and is used as a reference clock for 8-16 modulation processing in recording. The recording clock WTCK is also sent to the reproduction and recording position management circuit 11 and is used for detecting a reproduction or recording position during recording and reproduction in the reproduction and recording position management circuit 11.

Figure 3:
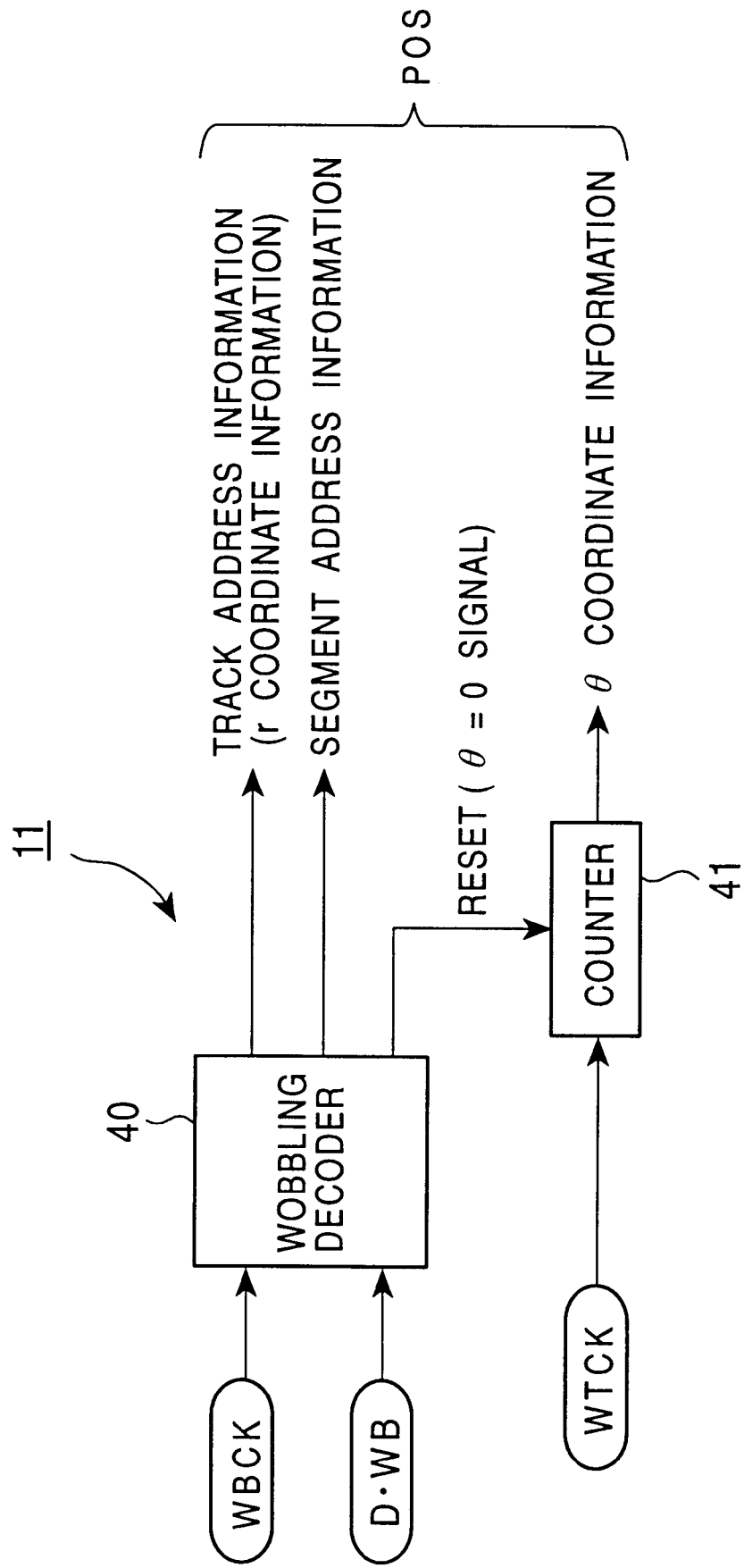
FIG. 3 is a block diagram of a reproduction and recording position management circuit according to the present embodiment.
Figure 4:
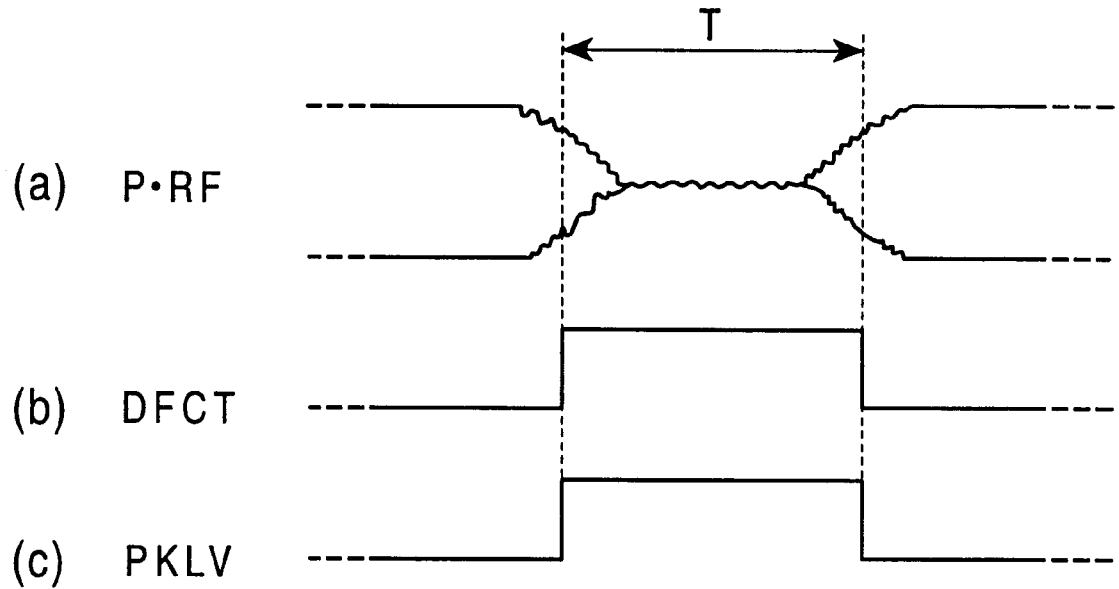
FIG. 4 is a view showing a relationship among a reproduced RF signal, a defect detection signal, and a peak detection signal.

FIG. 3 shows a configuration of the reproduction and recording position management circuit 11.

The reproduction and recording position management circuit 11 is provided with a wobbling decoder 40 and a counter 41. The wobbling decoder 40 decodes the wobbling reproduction data D·WB (having the data structure shown in FIG. 9) with the use of the wobbling reproduction data clock WBCK as a reference clock to obtain and output track address information and segment address information. The track address information is also handled as r coordinate information, which is position (coordinate) information in the disc radial direction.

The wobbling decoder 40 generates a θ=0 signal at the timing when a track start position (for example, the start position of segment 0 (see FIG. 7)) is detected, according to the segment address information and outputs it to the counter 41 as a reset signal.

The counter 41 counts the input recording clock WTCK in the ascending order and resets the count by the θ0=0 signal. Therefore, assuming that the θ0=0 signal corresponds to the start position of segment 0, the output of the counter 41 indicates, as the current recording and reproduction position information, angular position information with the start position of segment 0 being used as a reference. The counter 41 outputs θ coordinate information, which indicates the reproduction and recording angular position information.

As described above, the reproduction and recording position management circuit 11 can output recording and reproduction position management information POS, including at least the track address information (r coordinate information), the segment address information, and the θ coordinate information (and the θ0=0 signal). This recording and reproduction position management information POS is sent to the system controller 18 and is used for required recording and reproduction control.

When the system controller 18 references the track address information (r coordinate information) and the θ coordinate information, for example, the current recording and reproduction position information (r, θ) is identified on the disc.

In recording, the interface circuit 9 inputs recording user data R·UD to a DVD-data encoding circuit 13 as shown in FIG. 1. The DVD-data encoding circuit 13 encodes the recording user data R·UD to generate data having a format conforming to the DVD format, applies required signal processing such as adding an error correction code, and sends to the 8-16 modulation circuit 14.

The 8-16 modulation circuit 14 applies 8-16 modulation processing to the input data and sends to a recording RF waveform generation circuit 15.

The recording RF waveform generation circuit 15 is provided with a timing pulse generation circuit for generating a timing pulse used for controlling the timing of the emission level of laser light according to, for example, the 8-16 modulated data, and a laser driver for generating a driving signal used for driving a laser diode in the optical head 3 with the above timing pulse being input.

The optical head 3 receives the driving signal sent from the recording RF waveform generation circuit 15 and emits a laser. With this emission, data recording is performed on the disc 1 by the phase-change method.

An optical-system servo circuit 16 generates a focus control signal according to the input focus error signal FE and outputs to the optical head 3. With this signal, the objective of the optical head 3 is controlled such that the objective moves in the direction in which the objective approaches or retracts from the disc, namely, focus servo control is executed.

The optical-system servo circuit 16 also generates a tracking control signal and a sled control signal according to the tracking error signal TE and outputs them to the optical head 3 to execute focus servo control in which the objective is moved in the disc radial direction according to tracking and sled servo control in which the optical head 3 itself is moved in the disc radial direction.

The spindle servo circuit 17 detects the rotation speed of the spindle motor 2 from an FG pulse (a frequency signal synchronizing with the rotation speed) sent from the spindle motor 2 and receives reference speed information from the system controller 18. The spindle servo circuit 17 compares the reference speed information with the rotation speed of the spindle motor 2 and increases or reduces the speed of the spindle motor 2 according to the error information to implement disc rotation at the required rotation speed.

The system controller 18 is formed, for example, of a microcomputer, a ROM, and a RAM, and controls each function circuit section such that the recording and reproduction apparatus performs required operations.

In the present embodiment, the system controller 18 can determine whether the current reproduction position is within a linking section by referencing the reproduction and recording position management information POS output from the reproduction and recording position management circuit 11 and the contents of the table shown in FIG. 16, which is stored in the internal ROM. According to the contents of the table shown in FIG. 16, a sector number assigned to each track number (r coordinate information) can be identified. Since a linking section appears in every 17 sectors according to the data structure shown in FIG. 10, when certain calculation processing is performed with the linking section (sector number) first recorded on the disc being used as the start point, it is possible to identify the sector number of the sector assigned to a linking section. The linking point in the linking section (sector) can be identified by angular position information (θ coordinate) according to the position information of the track number (r coordinate information) of the track on which the sector is disposed.

As described above, the system controller 18 can determine whether the current reproduction position (corresponding to the state of the current reproduced RF signal) is a linking point. According to this determination result, the system controller 18 outputs a linking-point indicating signal PLKP which can indicate the timing when the current recording and reproduction position in the disc 1 corresponds to a linking point. In this case, the linking-point indicating signal PLKP is input to the reproduced RF waveform processing circuit 5 and as described later, is used for generating a timing for changing the time constant of the low-pass filter (filter section 31) in the reproduced RF waveform processing circuit 5.

5. Configuration of reproduced RF waveform processing circuit

Figure 2:
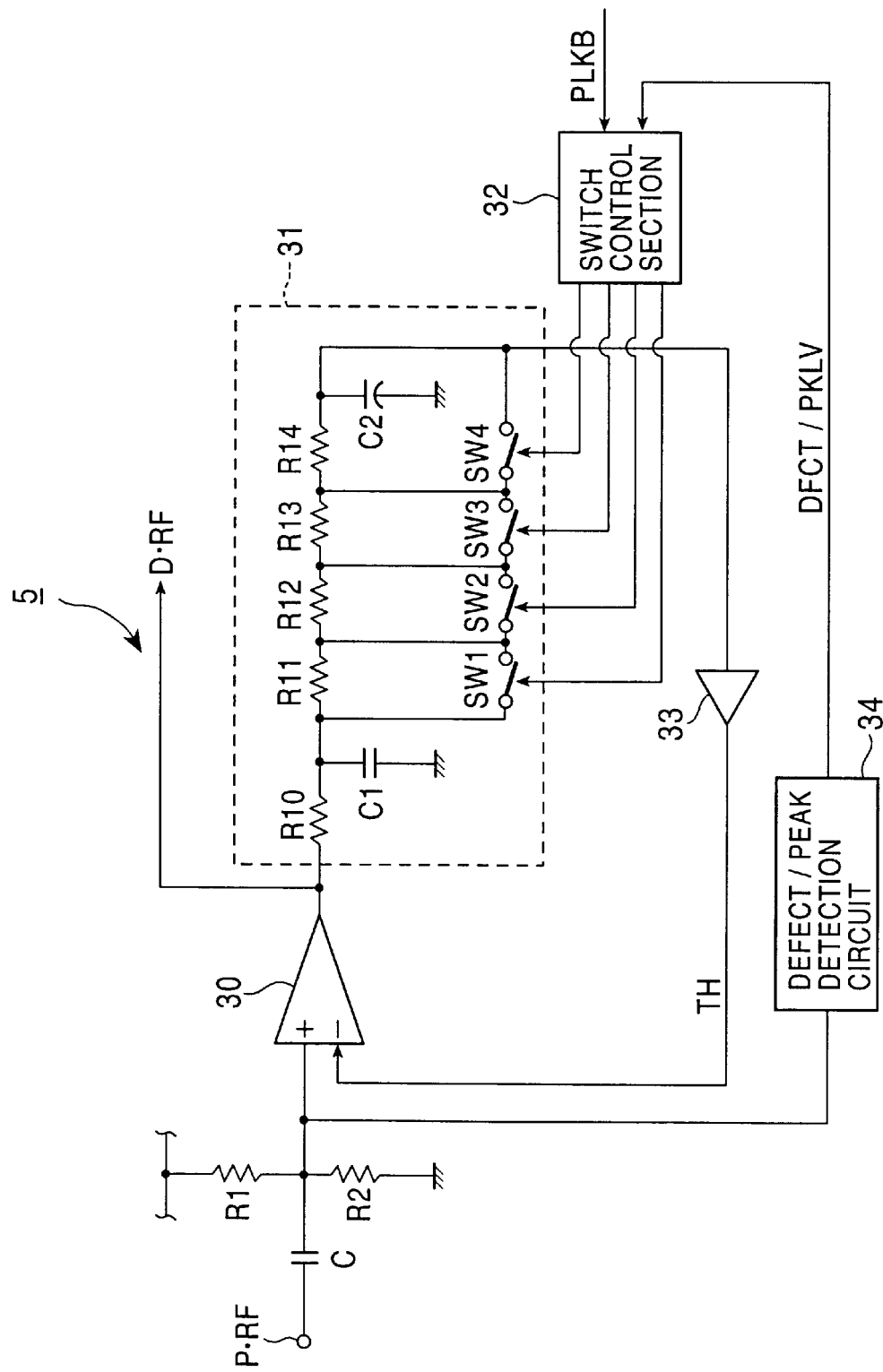
FIG. 2 is a block diagram of a reproduced RF waveform processing circuit according to the present embodiment.

FIG. 2 is a block diagram of a configuration example of the reproduced RF waveform processing circuit 5 according to the present embodiment.

The reproduced RF signal P·RF output from the RF matrix amplifier 4 is input to the non-inverted input terminal of a comparator 30 through a coupling capacitor C. Since a voltage division point of resistors R1 and R2 inserted between a DC power source line and the ground is connected to the non-inverted input terminal of the comparator 30, the amplitude center level of the reproduced RF signal P·RF sent through the coupling capacitor C is set.

The comparator 30 generates the binary RF signal D·RF from the reproduced RF signal P·RF input to the non-inverted input terminal, according to the level of a threshold TH input to the inverted input terminal, and outputs it.

The binary RF signal D·RF branches and is input to a filter section 31. This filter section 31 serves as a low-pass filter (integrator) and includes a first-stage filter formed of a resistor R10 and a capacitor C1, and a second-stage filter connected in series to the first-stage filter and formed of resistors R11, R12, R13, and R14 connected in series and a capacitor C2. The resistors R11, R12, R13, and R14 constituting the second-stage filter are connected in parallel to switches SW1, SW2, SW3, and SW4, respectively. When a switch is turned on, the resistor connected in parallel to the switch is bypassed. Therefore, the time constant of the second-stage filter can be variably set by selecting a resistor not bypassed among the resistors R11, R12, R13, and R14 with the use of ON/OFF control of the switches SW1, SW2, SW3, and SW4. Namely, the time constant of the filter section 31 can be variably controlled. A switch control section 32 controls the ON/OFF states of the switches SW1, SW2, SW3, and SW4. The resistors R11, R12, R13, and R14 need to be set to have appropriate resistances according to an actual use condition.

The output of the filter section 31 is amplified by an amplifier 33 and is input to the inverted input terminal of the comparator 30 as the threshold TH.

A defect/peak detection circuit 34 receives, for example, the reproduced RF signal P·RF which is not yet input to the coupling capacitor C, generates a defect detection signal DFCT and a peak detection signal PKLV according to the state of the reproduced RF signal, and outputs them to switch control section 32.

There may be a case, for example, in which the reproduced RF signal (whose waveform obtained after it is input to the coupling capacitor C is shown as a sample) is missing for some reason as shown in a period T of FIG. 4(a). If the signal is missing due to dust or scratches on the disc, it is observed that the reproduced RF signal P·RF which is not yet input to the coupling capacitor C has the minimum signal level. In such a case, the defect/peak detection circuit 34 outputs a defect detection signal DFCT of, for example, a high level as shown in FIG. 4(b).

If the reproduced RF signal is missing correspondingly to a non-signal state (including a track jump) on the disc, the reproduced RF signal P·RF which is not yet input to the coupling capacitor C conversely has the maximum signal level. When the defect/peak detection circuit 34 detects such a signal state, it outputs a peak detection signal PKLV of, for example, a high level as shown in FIG. 4(c).

The switch control section 32 receives the linking-point indicating signal PLKP, described above, the defect detection signal DFCT, and the peak detection signal PKLV, and according to these signals controls the ON/OFF states of the switches (SW1 to SW4) at the specified timing to allow the time constant of the filter section 31 to be variably controlled according to the state of the reproduced RF signal P·RF, which will be described later.

In the reproduced RF waveform processing circuit 5 configured as described above, a signal obtained by filtering the binary RF signal D·RF by the low-pass filter (filter section 31) is fed back to the inverted input terminal of the comparator 30 as a threshold TH to perform asymmetry compensation.

In a basic asymmetry compensation operation in the reproduced RF waveform processing circuit, the filter section 31 outputs the DC component having a level changed according to an error in the length of the inverted period of the binary RF signal, which is caused by the effect of asymmetry. In the filter section 31, the transmission speed (response speed) of the output corresponding to the input binary RF signal D·RF depends on the time constant determined by the connection conditions of the resistors R11, R12, R13, and R14.

Since the output of the filter section 31 is input to the inverted input terminal of the comparator 30 through the amplifier 33 as the threshold TH, the threshold TH varies according to an error in the length of the inverted period of the binary RF signal. The comparator 30 sets a level so as to cancel asymmetry by receiving such a threshold TH. Therefore, the comparator 30 outputs a binary RF signal having the length of the inverted period in which asymmetry is canceled.

6. Asymmetry compensation operation according to the present embodiment

In the present embodiment, the time constant of the filter section 31 is dynamically changed according to the state of a disc reproduced signal, as an asymmetry compensation operation in the reproduced RF waveform processing circuit 5. Therefore, irrespective of a change in the signal state, a stable reproduced signal processing operation is obtained.

In the present embodiment, the time constant of the filter section 31 should be changed at least in the following cases.

Case 1: when a reproduced RF signal input to the reproduced waveform processing circuit 5 corresponds to a linking section.

Reason: A linking section is inserted between groups for recording as described above (see FIG. 10). Therefore, it may be possible that recording has been finished in the current group and new recording starts at the next group. In this case, different appropriate levels may be required for the threshold TH used for asymmetry compensation because the characteristics of reproduced RF signal differ due to different recording conditions in the current group and the next group.

Case 2: When a defect detection signal DFCT or a peak detection signal PKLV is obtained from the state of a reproduced RF signal.

Reason: Assuming that the time constant of the filter section 31 is fixed to the value obtained before a reproduction RF signal is missing, in a signal-missing state in which a defect detection signal DFCT or a peak detection signal PKLV is obtained, the level of the threshold TH changes such that the reproduction RF signal converges according to the state in the signal-missing period. Therefore, when a reproduced signal is recovered, an inconvenience may happen of not obtaining the threshold TH corresponding the actual reproduced signal.

By referring to the timing chart shown in FIG. 5, an asymmetry compensation operation corresponding to the case 1 will be described below.

FIG. 5(a) shows a reproduced signal in a data state. Assuming that the block (N) has been reproduced and the reproduction of a linking section starts, the system controller 18 determines that the current reproduction position corresponds to the linking point and outputs a linking-point indicating signal PLKP at the timing shown in FIG. 5(b).

The switch control section 32 of the reproduced RF waveform processing circuit 5 sets an asymmetry high-speed drawing period Tac having the specified time length within the reproduction period of a linking section when a waiting period TW1 having the specified time length elapses after the timing when the linking-point indicating signal PLKP is input, as shown in FIG. 5(c).

In this asymmetry high-speed drawing period Tac, the on/off states of the switches SW1, SW2, SW3, and SW4 are controlled such that the time constant of the filter section 31 is set smaller than the standard time constant (namely, the time constant which allows the most stable operation to be obtained in a normal signal state) which had been set in a period before the asymmetry high-speed drawing period Tac.

Assuming that the standard time constant of the filter section 31 is set by the series connection of the resistors R11, R12, and R13 (SW1, SW2, and SW3 are set to off, and SW4 is set to on, which means the resistor R14 is bypassed), when any one or two of the resistors R11, R12, and R13 is bypassed during the asymmetry high-speed drawing period Tac, the transmission speed of the output corresponding to the input in the filter section 31 is increased and the signal converges more swiftly according to the current signal state in the period of the linking section.

When the asymmetry high-speed drawing period Tac is finished, the on/off states of the switches SW1, SW2, SW3, and SW4 are again controlled such that the time constant of the filter section 31 is changed to the standard time constant. At this point, a threshold TH almost appropriate for a reproduced signal in the block (N+1) is given and the asymmetry compensation operation has converged.

Figure 18A:
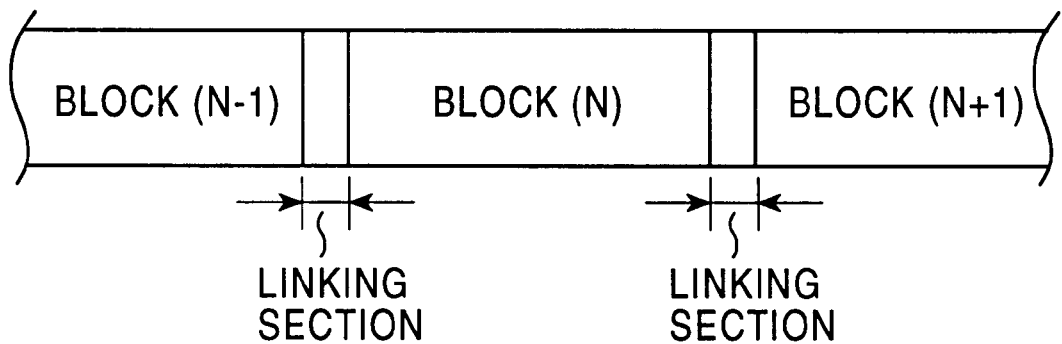
FIGS. 18A and 18B are a view of a structure of data obtained from a reproduced signal and a view of a transition of an appropriate threshold level for asymmetry compensation according to the state of a reproduced signal.
Figure 18B:
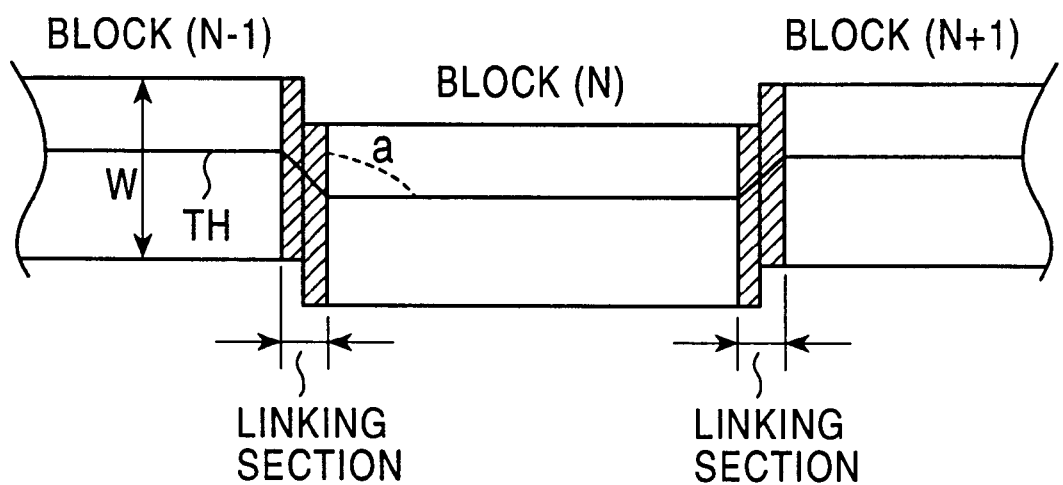

Even if recording is not continuously performed between the block N and the block (N+1), following the block N, the level of a threshold TH appropriate for a reproduced RF signal is obtained within the linking section period according to the recording conditions in the block N, with the above operation. Therefore, the ideal transition state of the level of the threshold TH shown in FIG. 18B can be obtained.

Figure 5:
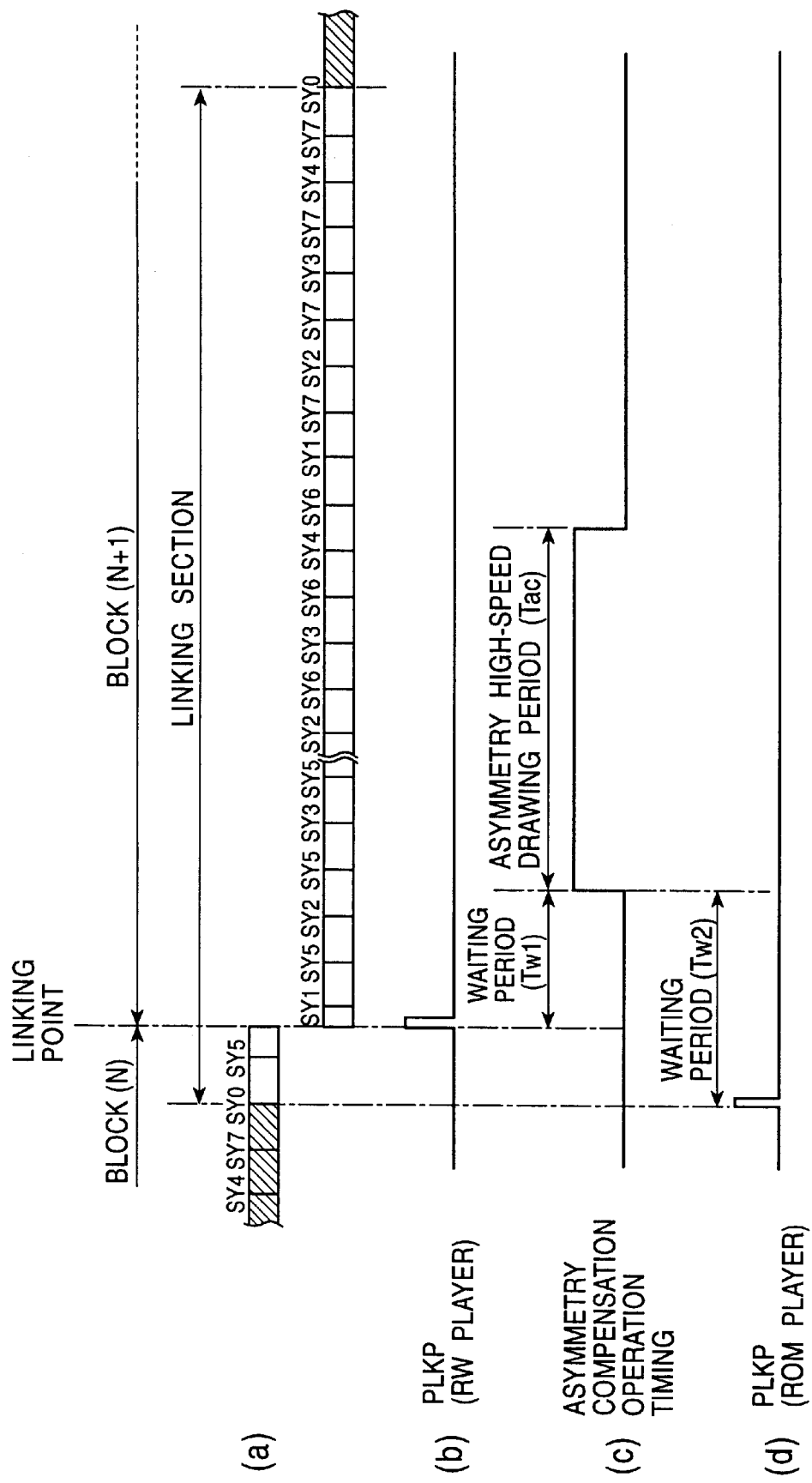
FIG. 5 is a timing chart of an asymmetry compensation operation according to the present embodiment.

The asymmetry high-speed drawing period Tac shown in FIG. 5 is just conceptually shown and merely indicates that an asymmetry operation is executed at least for the specified time length at the specified timing in a linking section. In other words, the asymmetry high-speed drawing period Tac can be set with its start timing and end timing being changed as required such that the most stable asymmetry compensation result is obtained according to the actual operation conditions. For example, the end timing of the asymmetry high-speed drawing period Tac needs to be specified according to a time sufficient for the convergence of the output of the filter section 31 with regard to the possible maximum characteristic error of the reproduced RF signal between adjacent blocks.

An asymmetry compensation operation corresponding to the case 2 can be configured in the following way.

Assume that it is determined that a reproduced RF signal P·RF input to the reproduced RF waveform processing circuit 5 shown in FIG. 2 is missing, and the defect/peak detection circuit 34 outputs a defect detection signal DFCT or a peak detection signal PKLV.

In this case, the switch control section 32 sets the time constant of the filter section 31 smaller than the standard time constant specified before the defect detection signal DFCT or the peak detection signal PKLV is input, as in the case 1, such that an asymmetry compensation operation traces more swiftly correspondingly to the signal state of the current reproduced RF signal P·RF.

When the defect detection signal DFCT or the peak detection signal PKLV is obtained as the signal state of the reproduced RF signal P·RF, if the reproduced signal is recovered, it is highly possible that the characteristics of the preceding reproduced RF signal is maintained. In that case, another method is applied. When the defect detection signal DFCT or the peak detection signal PKLV is input to the switch control section 32 from the defect/peak detection circuit 34, the switch control section 32 controls the switches SW1 to SW4 to set the time constant of the filter section 31 larger than the standard time constant specified before the defect detection signal DFCT or the peak detection signal PKLV is input. For example, assuming that the standard time constant of the filter section 31 is set by the series connection (SW1, SW2, and SW3 are set off, and SW4 is set on, which means the resistor R14 is bypassed) of the resistors R11, R12, and R13 as in the preceding case, all the resistors R11, R12, R13, and R14 are connected in series.

By setting the filter time constant larger than the standard value, the threshold TH used before the defect detection signal DFCT or the peak detection signal PKLV is detected is held in the present embodiment.

When neither the defect detection signal DFCT nor the peak detection signal PKLV is detected (it becomes a low level) and the reproduced signal is recovered, the switches SW1 to SW4 are controlled such that the filter section 31 has the standard time constant. Since the asymmetry compensation operation is performed so that the threshold TH being held continues, a stable asymmetry compensation operation is promptly obtained even immediately after the reproduced signal is recovered.

In an asymmetry compensation operation for the case 2, according to the input of the defect detection signal DFCT or the peak detection signal PKLV, the switch control section 32 changes the time constant of the filter section 31 for a period in which the defect detection signal DFCT and the peak detection signal PKLV are being detected (a period while they have high levels). In some cases, this period (timing setting) may start with a time difference to some extent, or may end (the time constant is switched to the standard one) at the timing when the specified time elapses from the start point with the timing of the reproduced-signal recovery being estimated.

Even in the case 1, described above, instead of executing a high-speed drawing with the filter time constant being set smaller than the standard, the filter time constant may be set larger than the standard to hold the level of the threshold TH obtained correspondingly to the reproduced signal in the preceding group within the linking section, as described above, according to an actual use condition.

7. Asymmetry compensation operation for DVD-ROM drive

The rewritable disc according to the present embodiment is compatible with a DVD-ROM as described by referring to FIG. 11. Therefore, the rewritable disc can be reproduced by a DVD-ROM drive (reproduction apparatus).

In the DVD-ROM system, wobbling address data is not specified in the disc format. Namely, wobbling is not formed in a DVD-ROM disc. Therefore, a DVD-ROM drive usually does not include a configuration for identifying the timing of a linking section by referencing wobbling address information (reproduction and recording position information on a disc) and the table (FIG. 16). As described by referring to FIG. 11, a linking section is not specified in the data structure.

Therefore, when a DVD-ROM drive is provided with the reproduced RF waveform processing circuit 5 according to the present embodiment and attempts to implement the asymmetry compensation operation described before by referring to FIG. 5(a) to FIG. 5(C), the operation based on the detection of the defect detection signal DFCT or the peak detection signal PKLV can be performed without any problem, but it is difficult to execute the operation related to a linking section.

To implement an asymmetry compensation operation corresponding to a linking section when the rewritable disc according to the present embodiment is reproduced by the DVD-ROM drive, the following configuration can be considered.

For example, a DVD-ROM drive roughly includes the reproduction circuit system (the reproduced RF waveform processing circuit 5, the RF-PLL circuit 6, the 8-16 demodulation circuit, and the DVD-data decoder circuit 8) of the recording and reproduction apparatus shown in FIG. 1. The recording system thereof is omitted. A circuit system in which address information is extracted according to a wobbling reproduction signal is omitted. Instead, a circuit for extracting address information from bit information preformatted on a disc is provided. The DVD-ROM drive identifies the type of a disc to be reproduced, a ROM disc or a RAM disc, according to lead-in information stored at the innermost position of the disc.

When such a configuration is provided, it can be considered that the system controller in the DVD-ROM drive detects a boundary of 16 sectors forming one block as reproduced data processing information transmitted from the DVD-data decoding circuit 8 by, for example, monitoring a frame synchronization signal, and then detects the timing of a linking section inserted between blocks of 16 sectors.

For example, to describe by referring again to FIG. 5, the system controller 18 in the DVD-ROM drive detects a frame synchronization signal of SY0 at the first frame of the sector following the 16-th sector in the block N, from the reproduced-data processing information transmitted from the DVD-data decoding circuit 8. At the timing of this detection, a linking-point indicating signal PLKP is output as shown in FIG. 5(d). In other words, the linking-point indicating signal PLKP in this case corresponds to substantially the start position of a linking section, and is output at a timing about two frames prior to the actual timing of the linking point.

When the switch control section 3 of the reproduced RF waveform processing circuit 5 in the DVD-ROM driver receives the linking-point indicating signal PLKP shown in FIG. 5(d), the switch control section 3 sets an asymmetry high-speed drawing period Tac after the waiting period TW2 specified as shown in the figure elapses. Then, the section performs the same operation as the reproduced RF waveform processing circuit 5, described above. With this configuration, even when the DVD-ROM drive reproduces a rewritable disc, the asymmetry compensation operation corresponding to the case 1, described above, can be appropriately executed.

Neither the configuration for detecting the linking section and nor the configuration of the asymmetry compensation apparatus (reproduced RF waveform processing circuit) is limited to that described in the present embodiment. A modification thereof is possible according to an actual use condition.

In the present embodiment, the asymmetry compensation apparatus (reproduced RF waveform processing circuit) is applied to a reproduction apparatus which handles a rewritable disc compatible with DVD-ROM. The present inven-

What is claimed is:

1. An asymmetry compensation apparatus comprising:
input level detecting means for making a detection signal obtained by comparing the level of a reproduced signal read from a disc-shaped recording medium with a threshold to a binary signal and for outputting the binary signal as a reproduced data signal;
asymmetry compensation means provided with a low-pass filter to which the detection signal is input from said input level detecting means, for compensating for asymmetry generated in the reproduced data signal by inputting as the threshold the output of the low-pass filter to said input level detecting means;
signal state detecting means for detecting a state in which the state of the reproduced signal matches the specified condition; and
time constant changing means for controlling such that the time constant of the low-pass filter is changed at the specified timing when said signal state detecting means detects a state in which the state of the reproduced signal matches the specified condition.

2. An asymmetry compensation apparatus according to claim 1, wherein said time constant changing means changes the time constant of the low-pass filter according to a change in the state of the reproduced signal detected by said signal state detecting means such that the threshold changes so as to allow higher speed tracking than in the standard case.

3. An asymmetry compensation apparatus according to claim 1, wherein said time constant changing means changes the time constant of the low-pass filter according to a change in the state of the reproduced signal detected by said signal state detecting means such that the preceding threshold is substantially maintained during the specified period.

4. An asymmetry compensation apparatus according to claim 1, wherein said signal state detecting means detects a state in which a reproduced signal input to said asymmetry compensation apparatus corresponds to link areas inserted in units of the specified data.

5. An asymmetry compensation apparatus according to claim 4,
wherein said asymmetry compensation apparatus handles a disc-shaped recording medium in which a data-recording track is wobbled according to a frequency modulation signal having address information;
said signal state detecting means includes:
position information storage means for storing the recording position information of the link areas on the disc-shaped recording medium; and
address information extracting means for extracting address information from a reproduced signal obtained by reproducing the wobbling of the track; and
a state in which a reproduced signal input to said asymmetry compensation apparatus corresponds to the link areas is detected by comparing the recording position information with the address information.

6. An asymmetry compensation apparatus according to claim 4,
wherein said signal state detecting means includes data contents identifying means for identifying the specified data contents in a reproduced data signal and
said signal state detecting means predicts the timing at which a reproduced signal input to said asymmetry compensation apparatus corresponds to a link area, according to the data contents.

7. An asymmetry compensation apparatus according to claim 1, wherein said signal state detecting means detects a state in which a reproduced signal input to said asymmetry compensation apparatus is missing.

8. A reproduction apparatus for reproducing data by making a reproduced RF signal read from a disc-shaped recording medium to a binary signal and for applying the specified demodulation processing to the binary signal, comprising:
a waveform processing circuit for producing a binary signal by comparing the reproduced RF signal with a threshold; and
a demodulation circuit for demodulating the binary RF signal,
said waveform processing circuit including: comparing means for comparing the reproduced RF signal with the threshold; and filter means for receiving the output signal of the comparing means and for changing a time constant according to the reproduction position on the disc-shaped recording medium where the reproduced RF signal is detected.

9. A reproduction apparatus according to claim 8 for the disc-shaped recording medium having a track which is wobbled according to address information and in which link areas are inserted in units of the specified data, further comprising:
address information extracting means for extracting the address information from a reproduced signal obtained from the wobbling of the track;
storage means for storing the position information indicating the recording position of the link areas; and
control means for changing the time constant by comparing the address information with the position information.

10. A reproduction apparatus according to claim 9, wherein said control means changes the time constant of said filter means such that the threshold changes at a higher speed than in a case in which a signal is sent from an area other than the link areas, when said control means detects a state in which the reproduced RF signal is sent from an area other than the link areas.

11. A reproduction apparatus according to claim 8 for the disc-shaped recording medium having a track including link areas inserted in units of the specified data and a plurality of sectors to which frame synchronization signals are inserted in units of data frames, further comprising:
address information extracting means for detecting the recording positions of the link areas according to the frame synchronization signals; and
control means for changing the time constant according to the timings when the recording positions are detected.

12. A reproduction apparatus according to claim 11, wherein said control means changes the time constant of said filter means according to the timings when the recording positions are detected such that the preceding threshold is substantially maintained during the specified period.

13. A reproduction apparatus according to claim 8, further comprising:
defect detecting means for detecting a state in which the reproduced RF signal is missing; and
control means for changing the time constant of said filter means according to the missing of the reproduced RF signal.

* * * * *

UNITED STATES PATENT AND TRADEMARK OFFICE
CERTIFICATE OF CORRECTION

PATENT NO. : 6,172,954 B1
DATED : January 9, 2001
INVENTOR(S) : Shozo Masuda

It is certified that error appears in the above-identified patent and that said Letters Patent is hereby corrected as shown below:

Column 1,
Line 30, change "an" to -- a --.

Column 2,
Line 24, change "enivironment" to -- environmental --.

Column 3,
Line 32, delete the comma.

Column 8,
Line 48, change "an" to -- a --.

Column 10,
Lines 28, 29 and 42, change "θ0=0" to -- θ=0 --.

Column 13,
Line 57, after "corresponding" insert -- to --.

Signed and Sealed this

Nineteenth Day of March, 2002

Attest:

JAMES E. ROGAN
Attesting Officer     Director of the United States Patent and Trademark Office